Aug. 29, 1950     W. G. CHARLEY     2,520,744
BREAKBACK IMPLEMENT ATTACHMENT FOR TRACTORS
Filed Oct. 31, 1946     2 Sheets-Sheet 2
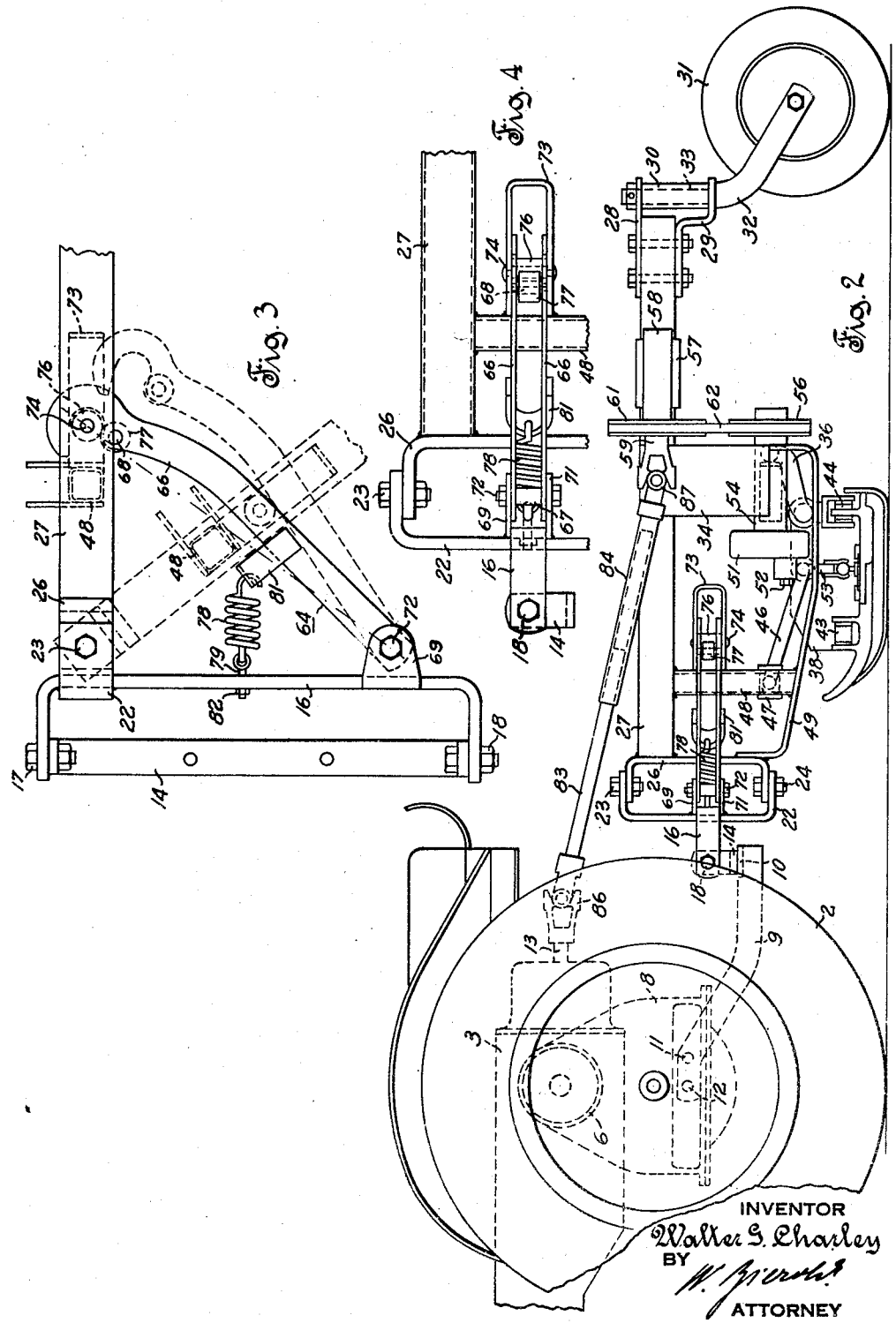
INVENTOR
Walter G. Charley
BY
ATTORNEY Patented Aug. 29, 1950

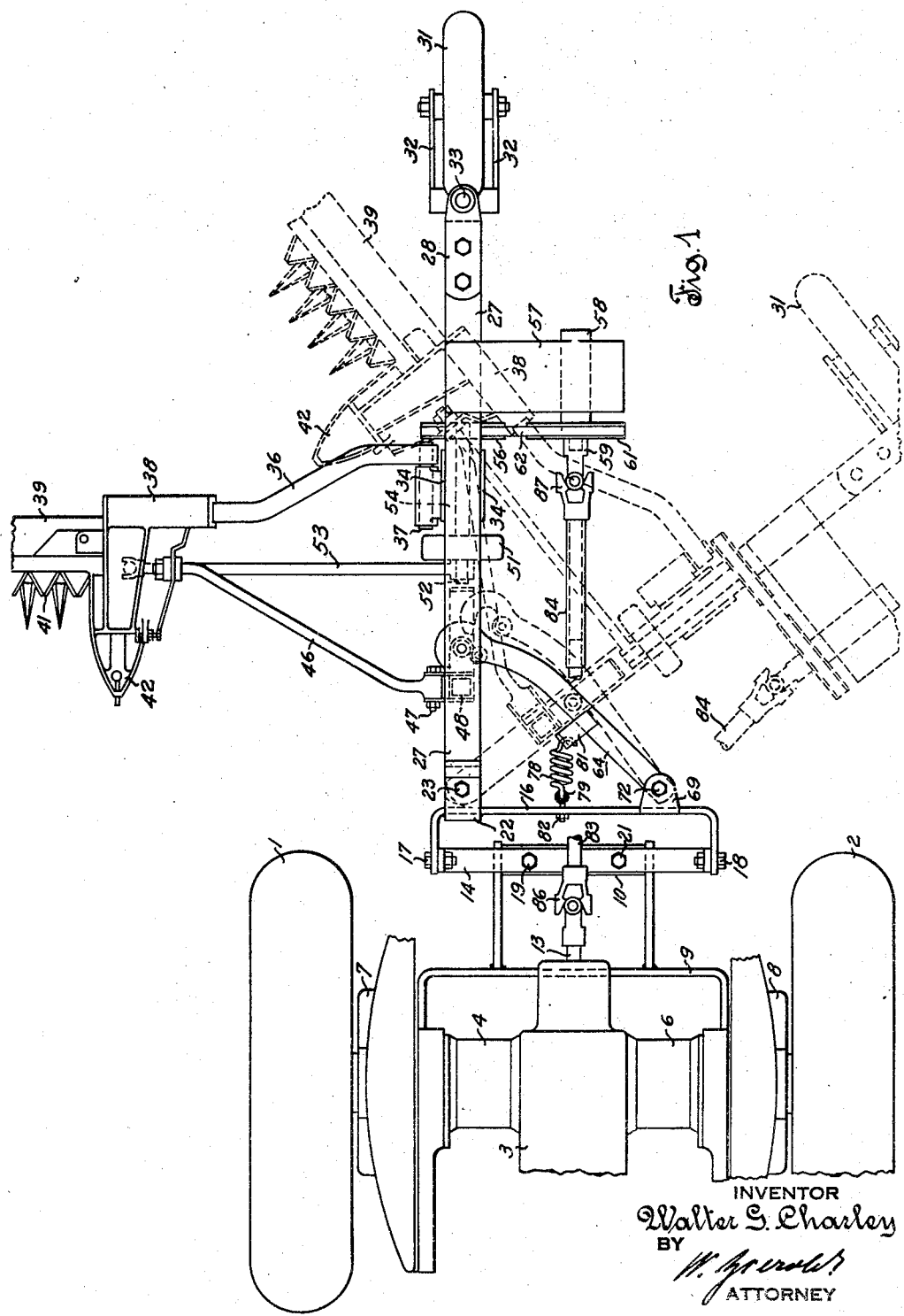

2,520,744

UNITED STATES PATENT OFFICE 2,520,744

BREAK-BACK IMPLEMENT ATTACHMENT FOR TRACTORS

Walter G. Charley, La Crescent, Minn., assignor to Allis-Chalmers Manufacturing Company, Milwaukee, Wis., a corporation of Delaware Application October 31, 1946, Serial No. 706,921

10 Claims. (Cl. 56—25)

This invention relates in general to implement attachments for tractors, and it is concerned more particularly with break-back implements, that is, with implements of the type which under normal operating conditions are retained in a desired working position with reference to a tractor and which may be advanced by the latter in said position, and which are so arranged that under emergency conditions, for instance, when the implement is driven in said working position against an obstruction beyond which it cannot be advanced by the tractor, the implement may pivot rearwardly relative to the tractor, or in other words, break-back from said working position, in order to avoid damage of the implement.

Certain types of tractor implements have heretofore been provided with break-back arrangements which are constructed in such a manner that the implements can be reconditioned for normal operation, after a break-back, by simply driving the tractor a short distance in reverse. For that purpose it has been customary, as for instance in tractor mowers, to provide an implement frame for mounting on the tractor and to connect a tool unit in break-back relation with said frame so that the tool unit may, under emergency conditions, pivot horizontally relative to the implement frame and tractor, or in other words, break-back from a normal working position to a rearwardly inclined non-working position.

For convenience in attaching implements to a tractor and detaching them therefrom it is generally more desirable to hitch them in trailing relation to the tractor rather than to mount them integrally with the tractor body, and while the prior art includes break-back implements, particularly mowers, which are adapted for hitching in trailing relation to a tractor, it is believed that the requirement for readily reconditioning such trailing type implements in the hereinabove mentioned manner, after a break-back, has not been met in a fully satisfactory manner by such implements as heretofore constructed.

Generally it is an object of the invention to provide an improved break-back implement which is adapted for hitching in trailing relation to any conventional type of tractor, and which may be readily reconditioned for normal operation, after a break-back, by simply driving the tractor a short distance in reverse.

A further object of the invention is to provide an improved trailing type implement of the above mentioned character incorporating a tool unit and a supporting frame therefor which are connected with each other for horizontal swinging movement in unison with each other relative to the tractor, and in which a break-back mechanism is operatively interposed between said supporting frame and the tractor.

A further object of the invention is to provide an improved trailing type implement in which a tool unit and a supporting frame therefor are arranged for horizontal swinging movement in unison with each other relative to the tractor, as stated, and which implement incorporates a break-back mechanism which is so constructed that it will normally function as a compression brace between said supporting frame and a reaction point on the tractor toward which point said frame is swung upon movement of the tool unit from a normal working position into a non-working position.

A further object of the invention is to provide an improved trailing type implement in which a power operated tool unit and a supporting frame for such tool unit are connected with each other for horizontal swinging movement in unison with each other relative to the tractor, and in which a break-back mechanism and a mechanism for transmitting power from a conventional power take-off shaft on the tractor to the tool unit are so arranged that the implement may conveniently be reconditioned for normal operation, after a break-back, by driving the tractor for a short distance in reverse.

More specifically, it is an object of the invention to provide an improved mowing implement which is adapted for hitching in trailing relation to any conventional type of tractor and which incorporates an improved mechanism for securing the mower frame against horizontal swinging movement relative to the tractor under normal operating conditions, and which mechanism will protect the mower against damage, by releasing the frame for such swinging movement when the cutting mechanism of the mower, in its normal working position, strikes an obstruction beyond which it cannot be advanced by the tractor.

A further object of the invention is to provide a mowing implement of the mentioned character incorporating an improved drive for the cutting mechanism, including a drive shaft on the mower frame to which power may be transmitted from a power take-off shaft on the tractor through a simple telescopic shaft connection, the construction of the mower and its relation to the tractor being such that upon movement of the cutting mechanism from its normal working position to a non-working position said drive shaft will move toward said power take-off shaft, or, at least, not recede therefrom.

These and other objects and advantages are attained by the present invention, various novel features of which will be apparent from the description herein and the accompanying drawings disclosing an embodiment of the invention, and will be more particularly pointed out in the claims.

In the accompanying drawings:

Fig. 1 is a top view of a trailing type breakback mower and of the rear portion of a conventional type tractor connected with the mower;

Fig. 2 is a side view of the tractor and mower assembly shown in Fig. 1;

Fig. 3 is an enlarged top view of a break-back mechanism incorporated in the mower shown in Figs. 1 and 2; and Fig. 4 is a fragmentary side view of the breakback mechanism shown in Fig. 3.

Referring to Figs. 1 and 2, right and left rear wheels 1 and 2, respectively, of a conventional type tractor are mounted on a rear axle structure comprising a central gear casing 3, hollow side arms 4 and 6, and final drive casings 7 and 8 depending, respectively, from the outer ends of side arms 4 and 6 and on which the rear wheels are mounted in axial alignment with each other. Mounted between the final drive casing 7 and 8 is a fabricated drawbar structure which comprises a U-shaped forward section 9 of relatively large width and a narrower rearward section including a transverse bar 10 which is rigidly connected by a pair of parallel longitudinal bars with the transverse portion of the forward section 9. A pin 11 and a bolt 12 (Fig. 2) are mounted on the left final drive casing 8, and a similar pin and bolt are mounted on the right final drive casing 7 to connect the opposite forwardly extending arms of the section 9 with the final drive casings 7 and 8, respectively, and to secure the drawbar structure against vertical displacement relative to the tractor body from the position in which the drawbar structure is shown in Fig. 2. A power take-off mechanism including a power take-off shaft 13 is mounted on the central gear casing 3 and is operable by the tractor motor in conformity with conventional practice, the power take-off shaft 13 being rotatable about a horizontal axis extending longitudinally of the tractor and centrally between the rear wheels 1 and 2.

The mower shown in Figs. 1 and 2 in rear of the tractor is of the semi-mounted type, that is it is equipped with a forward hitch structure by which it is partly sustained on the tractor, and with a rear support by which it is partly sustained on the ground and independently of the tractor.

The forward hitch structure for connecting the mower in supported relation to the tractor comprises a bracket 14 and a hitch bar 16 which are hingedly connected with each other by means of two pivot bolts 17 and 18 at opposite ends, respectively, of the bracket 14. The bracket 14 is formed of a piece of strap metal, the opposite ends of which are turned up and provided with holes for mounting of the bolts 17 and 18, and the straight portion of the bracket between its upturned ends has a pair of holes for the reception of fastening bolts 19 and 21 which are passed through said holes and through registering holes in the bar 10 of the drawbar structure so as to detachably secure the bracket 14 in a transversely and vertically fixed position on the tractor. The hitch bar 16 is likewise formed of a piece of strap metal which is bent into U-shape to provide forwardly extending ear portions which straddle the bracket 14 and have aligned holes for the reception of the bolts 17 and 18. The hitch bar 16 is thus connected with the tractor for pivotal movement about a horizontal transverse axis and in transversely fixed relation to the tractor. The bolts 17 and 18 are suitably retained on the bracket 14 to provide for free pivotal movement of the hitch bar 16 about the common axis of the bolts 17 and 18.

The hitch bar 16 carries a U-shaped bracket 22 (Fig. 2) which is rigidly secured as by welding, to the hitch bar 16 (Fig. 1) in proximity to the right end of the latter, that is, in proximity to the end of the hitch bar 16 which is connected to the bracket 14 by the bolt 17. The bracket 22 is formed of strap metal and extends at right angles to the hitch bar 16. The portion of the bracket 22 extending upwardly from the hitch bar 16 has a bent upper portion projecting rearwardly beyond the hitch bar 16, and the portion of the bracket 22 extending downwardly from the hitch bar 16 has a similarly bent lower portion projecting rearwardly beyond the hitch bar 16. Hingedly connected to the rearwardly projecting upper and lower portions of the bracket 22 by means of pivot bolts 23 and 24, as best shown in Fig. 2, is another bracket 26 which is similar to the bracket 22, an upper portion of the bracket 26 underlying the upper portion of the bracket 22 and having a hole in registry with a hole in the upper portion of the bracket 22 for the reception of the bolt 23, and the lower bent portion of the bracket 26 overlying the lower bent portion of the bracket 22 and having a hole in registry with a hole in the lower bent portion of the bracket 22 for the reception of the bolt 24. The bolts 23 and 24 are axially aligned with each other, and the bracket 26 is thus mounted for swinging movement about an axis in transversely fixed relation to the tractor.

The bracket 26 forms part of the frame structure of the mower, and it is rigidly secured, as by welding, to the forward end of a longitudinal frame member 27 which consists of a straight piece of square tubing and extends in right angle relation to the pivot axis afforded by the bolts 23 and 24. At its rear end the tubular frame member 27 carries rearwardly extending bracket straps 28 and 29 and a vertical bearing tube 30 mounted in said straps. A castering wheel support for the rear end of the frame member 27 comprises a wheel 31 and a wheel fork 32 which has a spindle portion 33 rotatably mounted in the vertical bearing tube 30.

Rigidly secured to the frame member 27, intermediate its front and rear ends is a depending bracket structure 34 (Fig. 2) to which a drag arm 36 (Fig. 1) is pivotally connected by means of a long pivot pin 37, the axis of the pivot pin 37 being disposed generally parallel to the frame member 27 and the drag arm 36 being freely swingable about said axis. Mounted on the outer end of the drag arm 36 in conventional manner is a cutter bar yoke 38 which forms part of a conventional cutting mechanism comprising a cutter bar 39, a reciprocable sickle bar 41, and an inner shoe 42, the inner shoe 42 being pivotally connected with the cutter bar yoke 38 by means of front and rear pivots 43 and 44, as best shown in Fig. 2. The yoke 38 is additionally connected with the frame structure of the mower by means of a diagonal rod 46 which is hinged by means of a pivot pin 47 to a post 48 rigidly secured to and depending from the frame member 27. As shown in Fig. 2, the lower end of the post 48 is connected as by welding, to a guard plate 49 which is secured at its forward end to the bracket 26 and at its rearward end to the depending bracket structure 34. The drag arm 36 and the rod 46 are mounted on the frame structure of the mower and cooperate with cutter bar yoke 38 so as to connect the cutting mechanism with the frame structure of the mower for movement in unison with the latter about the forward pivot axis afforded by the bolts 23 and 24.

Also mounted on the depending bracket structure 34 is a flywheel 51 which carries a crank pin 52. A pitman 53 is connected with the crank pin 52 and with the sickle bar 41 in conventional manner in order to reciprocate the sickle bar upon rotation of the flywheel 51. A bearing tube 54 for the shaft of the flywheel 51 is rigidly mounted on the bracket structure 34, and a driving sheave 56 for the flywheel shaft is arranged at the rear side of the bracket structure 34 as shown in Figs. 1 and 2.

At the left side of the frame tube 27, that is, at the side thereof, remote from the cutting mechanism, another bracket structure 57 (Fig. 1) is mounted on the frame tube 27 and carries a bearing tube 58 for an upper drive shaft 59. A sheave 61 is secured to the upper drive shaft 59 forwardly of the bracket structure 57 and in alignment with the sheave 56 on the lower bracket structure 34, the two sheaves being drivingly connected with each other by a belt 62.

The cutting mechanism may be raised and lowered by pivotal movement of the cutter bar 39 relative to the yoke 38 about the pivots 43 and 44, and by pivotal movement of the drag arm 36 relative to the mower frame about the axis of the pivot pin 37, in conformity with conventional practice, and a suitable mechanism, not shown, may be provided for that purpose and arranged in any convenient manner. For transport purposes, the cutter bar 39 may be swung upwardly about the pivots 43 and 44 (Fig. 2) on the yoke 38, and a tie rod or the like, not shown, is provided in conformity with conventional practice for retaining the cutter bar 39 in an upwardly tilted transport position relative to the frame structure of the mower.

Fig. 1 shows the mower in two positions behind the tractor, one, in full lines, which is the normal working position of the mower relative to the tractor and in which the cutter bar shoe 42 floatingly rides on the ground, and another position, in dotted lines, in which the frame and the cutting mechanism are angularly displaced relative to the tractor about the axis of the pivot bolts 23 and 24 so that the cutting mechanism occupies a rearwardly inclined non-working position. The front end of the mower frame 27 is connected to the hitch bar 16 by means of the pivot bolts 23 and 24 in proximity to the right end of the hitch bar 16, as stated hereinbefore, and it will be noted that in the normal working position of the mower the cutting mechanism, comprising the cutter bar 39 and the sickle bar 41, is disposed at one side of the frame member 27 whereas the portion of the hitch bar 16 which extends to the left of the bracket 22 is disposed at the other side of the frame member 27.

A releasable latch mechanism is operatively interposed between the hitch bar 16 and the frame member 27 for the purpose of releasably maintaining the cutting mechanism in the normal working position in which it is shown in full lines in Fig. 1. Referring to Figs. 3 and 4, a latch link generally designated by the reference character 64 comprises two parallel identical bars 66 which are arranged one above the other and separated from each other by a spacer sleeve 67 at one end of the latch link, and by a shoulder pin 68 at the other end. Upper and lower mounting lugs 69 and 71 for the latch link 64 are rigidly secured, as by welding, to the hitch bar 16 in proximity to the left end of the latter. The latch link 64 is inserted between the mounting lugs 69 and 71, and a pivot bolt or stud 72 extends through the lugs and through the spacer 67 to secure the latch link 64 to the hitch bar 16 for swinging movement about the axis of the pivot bolt 72.

Referring to Figs. 2 and 4, it will be noted that the hitch bar 16 and the mounting lugs 69 and 71 thereon are arranged in such vertical relation to the frame member 27 that the latter is located at a higher level than the mounting lugs 69 and 71. Mounted on the vertical post 48 of the frame structure, and on the same level as the mounting lugs 69 and 71 is a U-shaped bracket 73 which extends rearwardly from the post 48 and which slidably accommodates the latch link 64. Rotatably mounted on a stud 74 between the legs of the bracket 73 is a roller 76 which rests on the lower leg of the bracket 73 and whose axial length corresponds to the vertical spacing between the upper and lower legs of the bracket 73. In other words, the roller 76 occupies substantially the full height between the legs of the bracket 73 so that the roller may be engaged by the front edges of the upper and lower bars 66 of the latch link 64, as will be more fully discussed hereinbelow. Each of the upper and lower bars 66 of the latch link 64 has a hook shaped head at the free end of the latch remote from the pivot bolt 72, and in the position of the parts as shown in full lines in Figs. 1 and 3, the roller 76 is embraced by said hook shaped heads of the bars 66.

Another roller 77 of shorter axial length than the roller 76, is rotatably mounted on the shoulder pin 68 between the upper and lower bars 66 of the latch link 64. As best shown in Fig. 3, the shoulder pin 68 is located on the latch link 64 in proximity to the recesses of the upper and lower bars 66 which accommodate the roller 76 in the full line position of the parts, and the diameter of the roller 77 is such that a part of the roller projects radially beyond the edges of said recesses. More particularly, it will be noted that in the full line position of the parts, as shown in Fig. 3, the center of the roller 77 is located a short distance rearwardly of a line through the centers of the studs 72 and 74.

A coil spring 78 for drawing the latch link 64 into engagement with the roller 76 is anchored at one end on the hitch bar 16 by means of an eyebolt 79, and at the other end on the latch link 64 by means of a bracket 81 which straddles an intermediate portion of the latch link 64 and is rigidly secured thereto, as by welding. The eyebolt 79 extends through the hitch bar 16 and has a nut 82 by means of which the tension of the coil spring 78 may be adjusted.

The frame member 27 and the cutting mechanism comprising the cutter bar 39 and the sickle bar 41 are swingable in unison, as stated, about the vertical pivot axis afforded by the pivot bolts 23 and 24, and it will be noted that the releasable latch mechanism comprising the latch link 64 and the parts cooperating therewith, provides thrust transmitting means which are cooperative with the hitch bar 16 and with a portion of the frame member 27 rearwardly of said vertical pivot axis, to releasably secure the cutting mechanism against break-back movement from its normal working position in which it is shown in full lines in Fig. 1. When the cutter bar, in its normal working position, is driven against an obstruction, such as a rock or fence post, beyond which it cannot be advanced by the tractor, sufficient pressure will be transmitted from the roller 76 to the roller 77 to swing the latch link 64 rearwardly about its pivot center at 72, and in opposition to the tension of the coil spring 78.

Rearwardly swinging movement of the latch link 64 through coaction of the rollers 76 and 77 in the mentioned manner releases the mower frame and cutting mechanism for horizontal swinging movement in unison with each other about the forward pivot axis afforded by the bolts 23 and 24, and as a result, the cutting mechanism may break-back into the non-working position indicated in dotted lines in Fig. 1. During such break-back movement of the cutting mechanism the roller 76 rides along the forward edges of the bars 66 of the latch link 64, and the spring attaching bracket 81 on the link 64 may be engaged by the bracket 73 in order to limit the break-back movement of the cutting mechanism. It will be understood that when the cutting mechanism is driven, in its normal working position, against an obstruction, the latch link 64 is released and the tractor will have to be stopped before the bracket 73 hits the bracket 81.

In order to recondition the mower for normal operation after a break-back of the cutting mechanism, the necessary angular movement of the frame and cutting mechanism relative to the tractor about the pivot axis of the bolts 23, 24 may be accomplished by reverse driving of the tractor while the cutting mechanism rests on the ground. The frictional engagement of the cutting mechanism with the ground will usually afford sufficient resistance to swing the mower about the mentioned pivot axis, but if desired or necessary the cutter bar may first be raised and the tractor advanced a short distance so as to place the cutter bar in front of the obstruction. Upon subsequent lowering of the cutter bar and reverse movement of the tractor, the cutter bar may then be backed against the obstruction. When the cutting mechanism has been returned to its normal working position by reverse movement of the tractor, the roller 77 of the latch link 64 will automatically engage the roller 76 on the frame so as to relock the frame and cutting mechanism against pivotal movement relative to the hitch bar 16 about the axis of the pivot bolts 23, 24.

Considering the rollers 76 and 77 as thrust transmitting means, it will be noted that said thrust transmitting means are cooperable with the latch link 64 and with a portion of the frame member 27 rearwardly of the pivot axis afforded by the bolts 23 and 24, to automatically establish a bracing connection between the hitch bar 16 and the frame member 27 upon forward swinging movement of the cutting mechanism into its normal working position, and that the latch link 64 and the thrust transmitting means 76, 77 are operable to disable said bracing connection upon application of a rearward turning force to the cutting mechanism in excess of a predetermined limit.

A power transmitting connection between the power take-off shaft 13 on the tractor and the upper drive shaft 59 on the mower comprises a pair of telescopically connected shaft sections 83 and 84 which are connected, respectively, with the power take-off shaft 13 by a universal joint 86 and with the upper drive shaft 59 on the mower by means of a universal joint 87. It will be noted that when the frame and cutting mechanism move from the full line position to the dotted line position shown in Fig. 1, such movement is accommodated by the mentioned power transmitting connection, and the distance between the upper drive shaft 59 on the mower frame and the power take-off shaft 13 on the tractor becomes shorter. Such shortening of the distance between the two shafts is accommodated by forward sliding movement of the tubular shaft section 84 on the solid shaft section 83.

The power take-off shaft 13 is rotatable on the tractor, as mentioned hereinbefore, about a longitudinally extending axis, and it will be noted that the hitch means including the drawbar structure 9, 10, bracket 14, hitch bar 16 and bracket 22, are adapted to connect the mower frame with the tractor for horizontal pivotal movement of said frame relative to the tractor at a first point, which is indicated in Fig. 1 at 23, and which is offset from the axis of the power take-off shaft 13 toward one side of said axis, that is, toward the right of the tractor, as best shown in Fig. 1. It will further be noted that thrust transmitting means, including the roller 76 are cooperative with the frame at 74, that is, at a second point which is spaced a predetermined horizontal distance from said first point, and that other thrust transmitting means, including the latch link 64, are cooperable with the roller 76 and with the tractor, upon swinging movement of the frame and drive shaft 59 about said first point into a normally desired angular position relative to the axis of the power take-off shaft 13, to establish a bracing connection between said second point at 74 and a third point, at 72, in triangular relation to said first and second points and horizontally offset from the axis of the power take-off shaft 13 toward the left side of the tractor.

In normal operation of the mower, the drag of the cutting mechanism subjects the mower frame to a turning force which tends to swing said frame from its normal angularly adjusted position relative to the tractor in a direction to shorten the spacing between the mentioned second point at 74 and the third point at 72. One of these two points, namely, the one at 72, constitutes a reaction point for the latch link 64, and the other, at 74, constitutes a reaction point for the roller 76 which, as stated, is cooperable with the roller 77 on the latch link 64 to automatically disable the bracing connection between the hitch bar 16 and the frame member 27, when the cutting mechanism hits an obstruction. The tension of the spring 78 may be adjusted by means of the nut 82 on the eyebolt 79, as stated hereinbefore, and it will be seen that the latch link 64 and the rollers 76, 77 become operative to disable said bracing connection when the mentioned turning force exceeds a predetermined limit and which may be varied by adjustment of the nut 82.

Features and advantages of the present invention will be apparent from the foregoing description of an embodiment of the invention in a tractor mower; but it is to be understood that it is not desired to limit the invention to the particular form and details described hereinabove and that the invention includes such other forms and modifications as are embraced by the scope of the annexed claims.

It is claimed and desired to secure by Letters Patent:

1. A tractor attachable implement comprising a frame structure, a working tool operatively mounted on said frame structure for horizontal swinging movement in unison therewith and being positionable in laterally extending relation to a side portion thereof, hitch means for connecting said frame in trailing relation to a tractor carried part and including a hitch bar pivotally connected with a forward portion of said frame structure in advance of said working tool and extending laterally outward relative to a side portion of said frame opposite said working tool, said pivot connection affording horizontal swinging movement of said frame and working tool relative to said hitch bar, a thrust transmitting means operatively associated with portions of said hitch bar and frame structure spaced, respectively, sideward and rearward from said pivot connection, said operative association affording movement of said thrust transmitting means into and out of a position wherein said thrust transmitting means is securable in bracing relation with respect to said spaced portions of said hitch bar and frame structure, and an overload release means operatively associated with said thrust transmitting means and acting to maintain said thrust transmitting means positioned in said bracing relation as long as the turning force imparted to said frame structure through said working tool remains less than a predetermined amount.

2. A tractor attachable implement comprising a frame structure, a working tool operatively mounted on said frame structure for horizontal swinging movement in unison therewith and being positionable in laterally extending relation to a side portion thereof, hitch means for connecting said frame in trailing relation to a tractor carried part and including a hitch bar pivotally connected with a forward portion of said frame structure in advance of said working tool and extending laterally outward relative to a side portion of said frame opposite said working tool, said pivot connection affording horizontal swinging movement of said frame and working tool relative to said hitch bar, a thrust transmitting means operatively associated with portions of said hitch bar and frame structure spaced, respectively, sideward and rearward from said pivot connection, said operative association affording relative movement of said thrust transmitting means and frame structure into and out of a limiting position wherein said thrust transmitting means is securable in rigid bracing relation with respect to said spaced portions of said hitch bar and frame structure, and means including a resilient element and parts on said thrust transmitting means and frame structure coacting to urge said thrust transmitting means and frame structure into said limiting position and to releasably retain said thrust transmitting means disposed in rigid bracing relation with respect to said spaced portions of said hitch bar and frame structure.

3. A tractor mower comprising a frame structure, cutting mechanism operatively mounted on said frame structure for horizontal swinging movement in unison therewith and being positionable in laterally extending relation to a side portion thereof, hitch means for connecting said frame in trailing relation to a tractor carried part and including a hitch bar pivotally connected with a forward portion of said frame structure in advance of said cutting mechanism and extending laterally outward relative to a side portion of said frame opposite said cutting mechanism, said pivot connection affording horizontal swinging movement of said frame and cutting mechanism relative to said hitch bar, a thrust transmitting means operatively associated with portions of said hitch bar and frame structure spaced, respectively, sideward and rearward from said pivot connection, said operative association affording movement of said thrust transmitting means into and out of a position wherein said thrust transmitting means is securable in braced relation with respect to said spaced portions of said hitch bar and frame structure, and an overload release means operatively associated with said thrust transmitting means and acting to maintain said thrust transmitting means positioned in said bracing relation as long as the turning force imparted to said frame structure through said cutting mechanism remains less than a predetermined amount.

4. A tractor mower comprising a frame structure, cutting mechanism operatively mounted on said frame structure for horizontal swinging movement in unison therewith and being positionable in laterally extending relation to a side portion thereof, hitch means for connecting said frame in trailing relation to a tractor carried part and including a hitch bar pivotally connected with a forward portion of said frame structure in advance of said cutting mechanism and extending laterally outward relative to a side portion of said frame opposite said cutting mechanism, said pivot connection affording horizontal swinging movement of said frame and cutting mechanism relative to said hitch bar, a thrust transmitting means operatively associated with portions of said hitch bar and frame structure spaced, respectively, sideward and rearward from said pivot connection, said operative association affording relative movement of said thrust transmitting means and frame structure into and out of a limiting position wherein said thrust transmitting means is securable in rigid bracing relation with respect to said spaced portions of said hitch bar and frame structure, and means including a resilient element and parts on said thrust transmitting means and frame structure coacting to urge said thrust transmitting means and frame structure into said limiting position and to releasably retain said thrust transmitting means disposed in rigid bracing relation with respect to said spaced portions of said hitch bar and frame structure.

5. A tractor mower comprising a frame having a ground engaging castering device supporting a rear end portion thereof, cutting mechanism operatively mounted on said frame for horizontal swinging movement in unison therewith and being positionable in laterally extending relation to a side portion of said frame intermediate forward and rear end portions thereof, hitch means for connecting said frame in trailing relation to a tractor and including a hitch bar pivotally connected with a forward portion of said frame in advance of said cutting mechanism and extending laterally outward from the side of said frame opposite said cutting mechanism, said pivot connection affording horizontal swinging movement of said frame and cutting mechanism relative to said hitch bar, and a thrust transmitting means operatively associated with a part of said laterally outward portion of said hitch bar horizontally spaced from said pivot connection and with a part of said frame to the rear of said pivot connection, said operative association including elements affording movement of said thrust transmitting means into and out of a position forming a generally triangular relation with said hitch bar and frame and affording, when in this relation, a coaction between some of said elements operative to retain said thrust transmitting means in releasably fixed bracing relation with respect to said hitch bar and frame.

6. In a tractor mower having an implement frame operatively supporting a cutting mechanism positionable in laterally extending relation to one side thereof, an improved break-back hitch means for connecting said frame in trailing relation to a tractor and comprising a hitch bar supported for pivotal movement about a horizontal axis extending transversely with respect to the normal direction of travel, pivot means connecting said hitch bar with said frame for pivotal movement of the latter relative to said bar about a vertical axis, thrust transmitting means operatively connected with said hitch bar at a reaction point spaced horizontally from said vertical pivot axis, and complementary thrust transmitting means operatively connected with said frame at another reaction point spaced horizontally rearward from said vertical axis, said first and second mentioned thrust transmitting means being relatively movable to establish a triangular relation with the associated pivotally joined portions of said hitch bar and frame and including elements releasably coacting to effect a bracing connection between said thrust transmitting means and reaction points operatively securing said frame in releasably fixed, trailing relation to said hitch bar, and said elements being releasable in response to a turning force being transmitted to said frame through said cutting mechanism, in excess of a predetermined amount.

7. In a tractor mower having an elongated frame member and having a cutting mechanism operatively mounted on said member for horizontal swinging movement in unison therewith, and being positionable to extend laterally outward from one side of said frame member, an improved break-back hitch means for connecting said frame member in trailing relation to a tractor and comprising a hitch bar pivotally connected with a portion of said frame member in advance of said cutting mechanism and extending laterally outward beyond the other side of said member, said pivot connection affording horizontal swinging movement of said frame member relative to said hitch bar, and a thrust transmitting means operatively associated with a portion of said hitch bar laterally spaced from said other side of said frame member and with a portion of said frame member to the rear of said pivot, said operative association including elements affording movement of said thrust transmitting means into and out of a position forming a generally triangular relation with said hitch bar and frame member and affording, when in this relation, a coaction between some of said elements operative to retain said thrust transmitting means in releasably fixed bracing relation with respect to said hitch bar and frame member.

8. In a tractor mower having an elongated frame member and having a cutting mechanism operatively mounted on said member for horizontal swinging movement in unison therewith, and being positionable to extend laterally outward from one side of said frame member, an improved break-back hitch means for connecting said frame member in trailing relation to a tractor and comprising a hitch bar pivotally connected with a portion of said frame member in advance of said cutting mechanism and extending laterally outward beyond the other side of said member, said pivot connection affording horizontal swinging movement of said frame member relative to said hitch bar, a rigid link member supported for horizontal swinging movement on a pivot support carried by a portion of said bar adjacent said other side of said frame member and laterally spaced from said pivot connection, and a thrust transmitting latch means carried by a portion of said frame member to the rear of said pivot connection in position to coact with a free end portion of said link member and establish a triangular structure wherein said link member acts as a brace securing said frame member in releasably fixed, trailing relation to said hitch bar.

9. In a tractor mower having an elongated frame member and having a cutting mechanism operatively mounted on said member for horizontal swinging movement in unison therewith, and being positionable to extend laterally outward from one side of said frame member, an improved break-back hitch means for connecting said frame member in trailing relation to a tractor and comprising a hitch bar pivotally connected with a portion of said frame member in advance of said cutting mechanism and extending laterally outward beyond the other side of said member; said pivot connection affording horizontal swinging movement of said frame member relative to said hitch bar; a pair of stud elements mounted, respectively, on a portion of said frame member rearwardly of said pivot connection, and on a portion of said hitch bar adjacent said other side of said frame member and laterally spaced from said pivot connection; and a rigid latch member pivoted on one of said stud elements for horizontal swinging movement and presenting a free end portion releasably coactable with said other stud element to establish a triangular structure wherein said latch member acts as a brace securing said frame member in releasably fixed, trailing relation to said hitch bar.

10. A tractor attachable implement comprising a frame structure, a working tool operatively mounted on said frame structure for horizontal swinging movement in unison therewith and being positionable in laterally extending relation to a side portion thereof, hitch means for connecting said frame in trailing relation to a tractor carried part and including a hitch bar pivotally connected with a forward portion of said frame structure in advance of said working tool and extending laterally outward relative to a side portion of said frame opposite said working tool, said pivot connection affording horizontal swinging movement of said frame and working tool relative to said hitch bar, a thrust transmitting means operatively associated with portions of said hitch bar and frame structure spaced, respectively, sideward and rearward from said pivot connection, said operative association affording horizontal swinging movement of said thrust transmitting means relative to said hitch bar and frame structure and including elements coacting to releasably secure said thrust transmitting means in rigid bracing relation with respect to said portions, one of said portions having parts associated therewith for continuous engagement with said thrust transmitting means during horizontal swinging movement of said frame and thrust transmitting means relative to each other and relative to said hitch bar, and resilient means continuously acting to urge said thrust transmitting means and frame structure into said bracing relation.

WALTER G. CHARLEY.

REFERENCES CITED

The following references are of record in the file of this patent:

UNITED STATES PATENTS

| Number | Name | Date |
|---|---|---|
| 917,603 | Hench | Apr. 6, 1909 |
| 1,219,342 | Myers | Mar. 13, 1917 |
| 1,786,006 | Criley | Dec. 23, 1930 |
| 2,198,910 | Everett | Apr. 30, 1940 |
| 2,284,003 | Luppert | May 26, 1942 |
| 2,314,216 | Hilblom | Mar. 16, 1943 |
| 2,331,863 | Schroeppel | Oct. 12, 1943 |

FOREIGN PATENTS

| Number | Country | Date |
|---|---|---|
| 146,363 | Great Britain | May 12, 1921 |